United States Patent
Seminel et al.

(10) Patent No.: US 11,085,513 B2
(45) Date of Patent: Aug. 10, 2021

(54) ACTUATOR POSITION SENSOR MECHANISM

(71) Applicant: Ratier-Figeac SAS, Figeac (FR)

(72) Inventors: Bruno Seminel, Lissac-et-Mouret (FR); Adil Sardi, Capdenac (FR); Frédéric Vermande, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 242 days.

(21) Appl. No.: 16/030,989

(22) Filed: Jul. 10, 2018

(65) Prior Publication Data
US 2019/0092455 A1   Mar. 28, 2019

(30) Foreign Application Priority Data
Sep. 25, 2017  (EP) .................................. 17306261

(51) Int. Cl.
*F16H 25/20* (2006.01)
*G01D 5/04* (2006.01)
*B64C 13/24* (2006.01)
*B64C 13/30* (2006.01)

(52) U.S. Cl.
CPC .......... *F16H 25/2015* (2013.01); *G01D 5/04* (2013.01); *B64C 13/24* (2013.01); *B64C 13/30* (2013.01)

(58) Field of Classification Search
CPC .... F16H 25/2015; B25J 9/1694; B25J 13/088
USPC .... 700/68, 69, 114, 186, 189, 229; 702/150, 702/151
See application file for complete search history.

(56) References Cited

U.S. PATENT DOCUMENTS

| 2,447,208 | A | * | 8/1948 | Rendel | G01B 21/32 |
| | | | | | 702/158 |
| 2,957,687 | A | | 10/1960 | Chillson et al. | |
| 3,146,830 | A | * | 9/1964 | Joline | F02D 17/04 |
| | | | | | 416/26 |
| 3,405,888 | A | * | 10/1968 | Okamoto | F41G 7/24 |
| | | | | | 244/3.14 |
| 3,833,843 | A | * | 9/1974 | Bossons | B23D 36/0041 |
| | | | | | 318/11 |
| 4,611,269 | A | * | 9/1986 | Suzuki | G01B 7/003 |
| | | | | | 318/602 |

(Continued)

FOREIGN PATENT DOCUMENTS

DE       19821467 A1   11/1999
DE   102004019379 A1   11/2005

(Continued)

OTHER PUBLICATIONS

Extended European Search Report for International Application No. 17306261.3 dated Jan. 17, 2018, 10 pages.

(Continued)

*Primary Examiner* — Bobby Rushing, Jr.
(74) *Attorney, Agent, or Firm* — Cantor Colburn LLP

(57) ABSTRACT

The system of the present disclosure provides two or more sensors located on two parallel transmission or kinematic paths having different ratios with respect to the actuator position. Each sensor provides a different position measurement output and the difference between the sensor outputs provides a reduced indication of the position of the actuator/moved component. Integrating sensors in the reduction path avoids the need for the reduction gear mechanism.

6 Claims, 3 Drawing Sheets

(56) References Cited

U.S. PATENT DOCUMENTS

| | | | | |
|---|---|---|---|---|
| 4,636,959 | A * | 1/1987 | Salazar | G07B 17/00467 |
| | | | | 101/91 |
| 5,072,399 | A * | 12/1991 | Laws | G05B 19/186 |
| | | | | 700/186 |
| 5,367,237 | A * | 11/1994 | Ring | B64C 13/50 |
| | | | | 318/616 |
| 7,080,825 | B1 * | 7/2006 | George | B66D 3/18 |
| | | | | 254/267 |
| 8,057,345 | B2 * | 11/2011 | Pinkos | G01R 33/093 |
| | | | | 475/150 |
| 2014/0005976 | A1 | 1/2014 | Platzer et al. | |
| 2014/0290079 | A1 | 10/2014 | Houda | |
| 2015/0027251 | A1 * | 1/2015 | Himmelmann | F16H 25/2021 |
| | | | | 74/89.27 |
| 2015/0251748 | A1 | 9/2015 | Grand | |

FOREIGN PATENT DOCUMENTS

| | | |
|---|---|---|
| DE | 1023004019379 A1 | 11/2005 |
| DE | 102005035107 A1 | 2/2007 |
| FR | 2872483 A1 | 1/2006 |
| JP | 2007046734 A | 2/2007 |

OTHER PUBLICATIONS

EPO Official Letter for Application No. 17306261.3, dated Jan. 16, 2020, 6 pages.

* cited by examiner

ACTUATOR POSITION SENSOR MECHANISM

FOREIGN PRIORITY

This application claims priority to European Patent Application No. 17306261.3 filed Sep. 25, 2017, the entire contents of which is incorporated herein by reference.

TECHNICAL FIELD

The present disclosure relates to an actuator mechanism for moving a component relative to a structure and sensing the component position for example, but not limited to, for moving a moveable part in flight control systems of an aircraft e.g. a flap or a stabilizer. The actuator mechanism of the disclosure finds application, for example, in a trimmable horizontal stabiliser actuator (THSA) but this is just one example.

BACKGROUND

Mechanical actuators find use in a very wide range of fields and applications for causing movement of a component in response to a control command through a drive path. In the example of an actuator to control horizontal stabilizers at an aircraft tail, to adjust the longitudinal pitch or 'trim' of the aircraft, conventionally a so-called ball screw actuator is used. As described further below, with reference to FIG. 1, such actuators are arranged to be driven by a drive means such as a motor which causes a screw shaft to rotate. A nut mounted on the screw shaft is caused to move linearly relative to the shaft in response to rotation of the shaft. The nut is coupled to the stabilizer to move the stabilizer relative to the tail. The actuator needs to monitor the position of the stabilizer (i.e. monitor the position of the nut which is indicative of the position of the stabilizer). Conventionally, this is done by means of a position sensor assembly. The screw shaft is coupled, e.g. via a gear wheel, to a sensor wheel such that rotation of the shaft causes rotation of the sensor wheel. The sensor wheel rotates a sensor wheel shaft which is coupled to a stabilizer position sensor via a reduction gearbox (also sometimes called a mini-reducer).

A problem that has been identified with such conventional actuator systems is that the position measuring cannot be performed directly on the output from the actuator assembly, and some movement conversion, e.g. by amplification or reduction gear mechanisms is required in the path from the actuator to the sensor. This results in a complex, bulky system that is difficult and expensive to manufacture, and that can suffer from inaccuracies in position sensing.

There is, therefore, a need for a smaller, simpler, more accurate position sensor train that avoids these problems.

SUMMARY

The system of the present disclosure avoids the need for a reduction gear mechanism by integrating position sensing in two parallel transmission paths having different ratios and providing the difference between the outputs of the two paths as an input to a position sensor.

Accordingly, there is provided an actuator position measurement assembly comprising a first path arranged to provide a first output comprising a position of an actuator factored by a first ratio, and a second path arranged to provide a second output comprising the position of the actuator factored by a second, different ratio; and a comparator arranged to compare the first and second outputs and to provide a difference between the first and second outputs to a monitor device.

The monitoring device may be a position sensor or could be some other monitor such as a speed monitor, a thresholding system, a self-regulating system used as feedback for a control loop or the like.

The actuator position measurement assembly is preferably coupled as part of an actuator assembly wherein the actuator comprises an actuator screw shaft on which is mounted an actuator nut, the actuator screw shaft arranged to be rotated in response to an actuator control signal and wherein rotation of the actuator screw shaft causes a relative axial movement of the actuator nut along the shaft, and wherein the actuator screw shaft is coupled e.g. via a gear mechanism, to the sensor screw shaft to cause corresponding rotation of the sensor screw shaft.

In an alternative arrangement, the transformation movement carried out by the screw-nut joint could be replaced by a rotation to translation join performed by a cam of a crank drive system.

Preferably, the actuator nut is coupled to, e.g. via a link mechanism, a component to be moved by the actuator according to the actuator control signal, e.g. a horizontal stabilizer.

DETAILED DESCRIPTION

Figure 1:
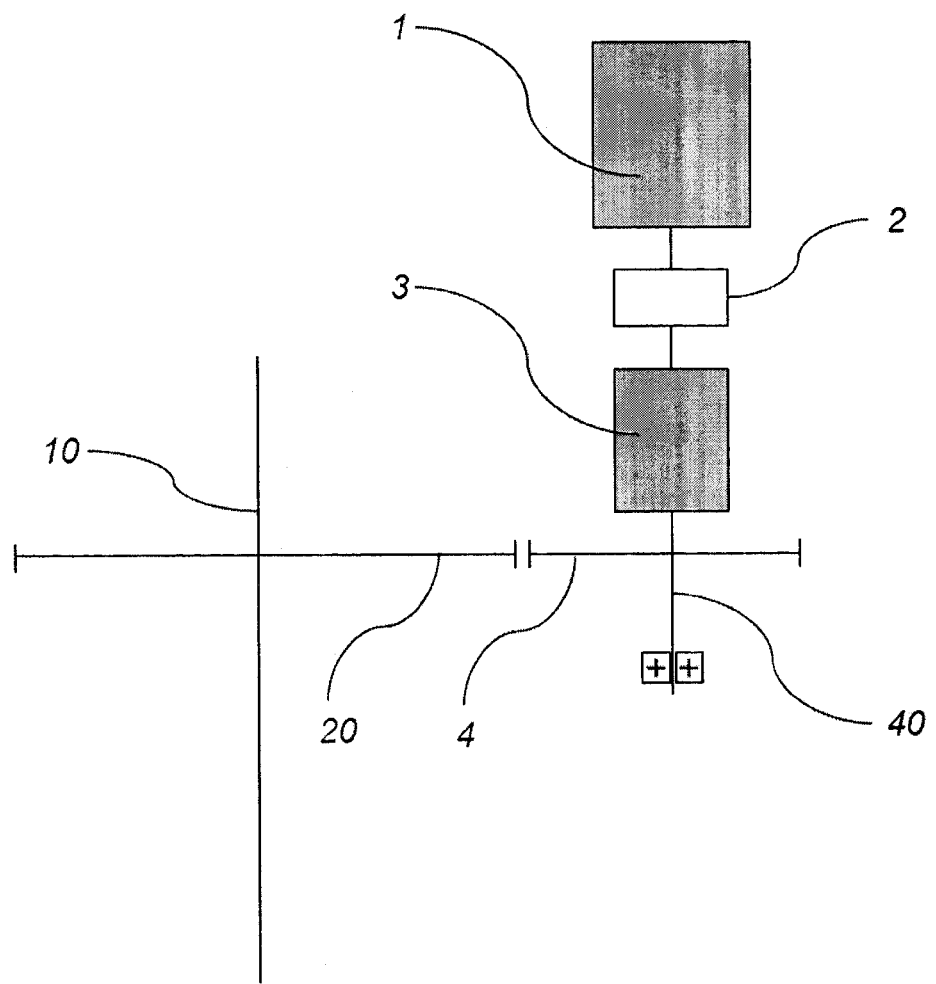
FIG. 1 is a schematic diagram of a conventional position measurement system for an actuator assembly.
Figure 2:
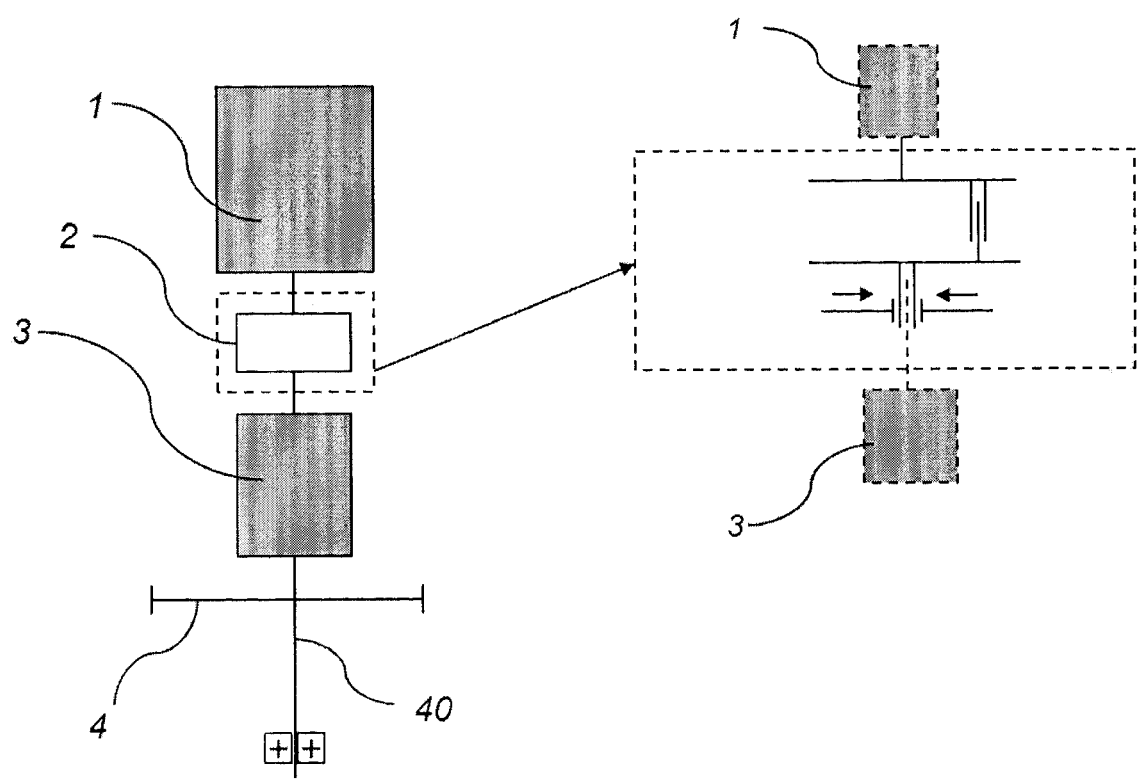
FIG. 2 is a more detailed schematic diagram of the position sensor gear train of a system such as shown in FIG. 1, with a detail of the coupling device.

Referring to FIGS. 1 and 2, conventional systems will first be described. As briefly described above, in a conventional system, the actuator mechanism comprises an actuator screw shaft 10 that rotates in accordance with a position control signal e.g. from a motor or other control. In an aircraft, for example, this control signal could be generated automatically from flight controls, or mechanically by e.g. movement of a lever by a pilot. Rotation of the actuator screw shaft 10 causes axial movement of an actuator nut (not shown) mounted on the shaft. The actuator nut is coupled to the component to be moved e.g. the horizontal stabilizer, so that the control command causes the shaft to rotate which causes the nut to move axially which causes corresponding movement of the stabilizer or other component to be moved. Other types of actuators are, of course, known and the system of the present disclosure can be adapted to determine the position of different types of actuator.

It is necessary, for safe and reliable control, to measure or determine the position of the stabilizer or other moved component during its movement. This is performed in the example shown by a position sensor assembly which determines the position of the actuator nut, and hence the stabilizer, by monitoring the rotation of the actuator screw shaft 10. The position sensor assembly is coupled to the rotating actuator screw shaft e.g. via a gear mechanism comprising an actuator screw shaft gear wheel 20 in intermeshing engagement with a sensor wheel 4 of the sensor assembly. Rotation of the actuator screw shaft therefore causes rotation of the actuator screw shaft gear wheel 20 which in turn causes rotation of the sensor wheel 4. Rotation of the sensor wheel 4 causes rotation of a sensor shaft 40 on which the sensor wheel is mounted. In different types of actuator, position sensor assemblies are coupled to measure movement e.g. linear movement, of actuator parts as an indication of the position of the component being moved by the actuator.

The sensor shaft is therefore coupled to a reduction gear box 3 which, in turn, is connected to a position sensor 1 via a coupling device 2. A preferred coupling device is shown in more detail in the dashed line extract of FIG. 2. This combined reduction train of the reduction gear box and coupling device provides an encoded position indication to the position sensor from which the position sensor 1 can determine the rotation of the actuator screw shaft and, hence, the actuator nut and, hence the component to be moved (not shown). Problems with such conventional systems have been outlined above.

The system of the present disclosure avoids the need for the reduction gear and resolver and simplifies the interface between the actuator output and the position sensor system. The system of the present disclosure provides two or more sensors located at different positions in the actuator's transmission path. Each sensor provides a different position measurement output and the difference between the sensor outputs provides a reduced indication of the position of the actuator/moved component. Integrating sensors in the reduction path avoids the need for the reduction gear mechanism.

The principles of the system of the present disclosure will now be described in more detail with reference to FIGS. 3 and 4.

Figures 3, 4:
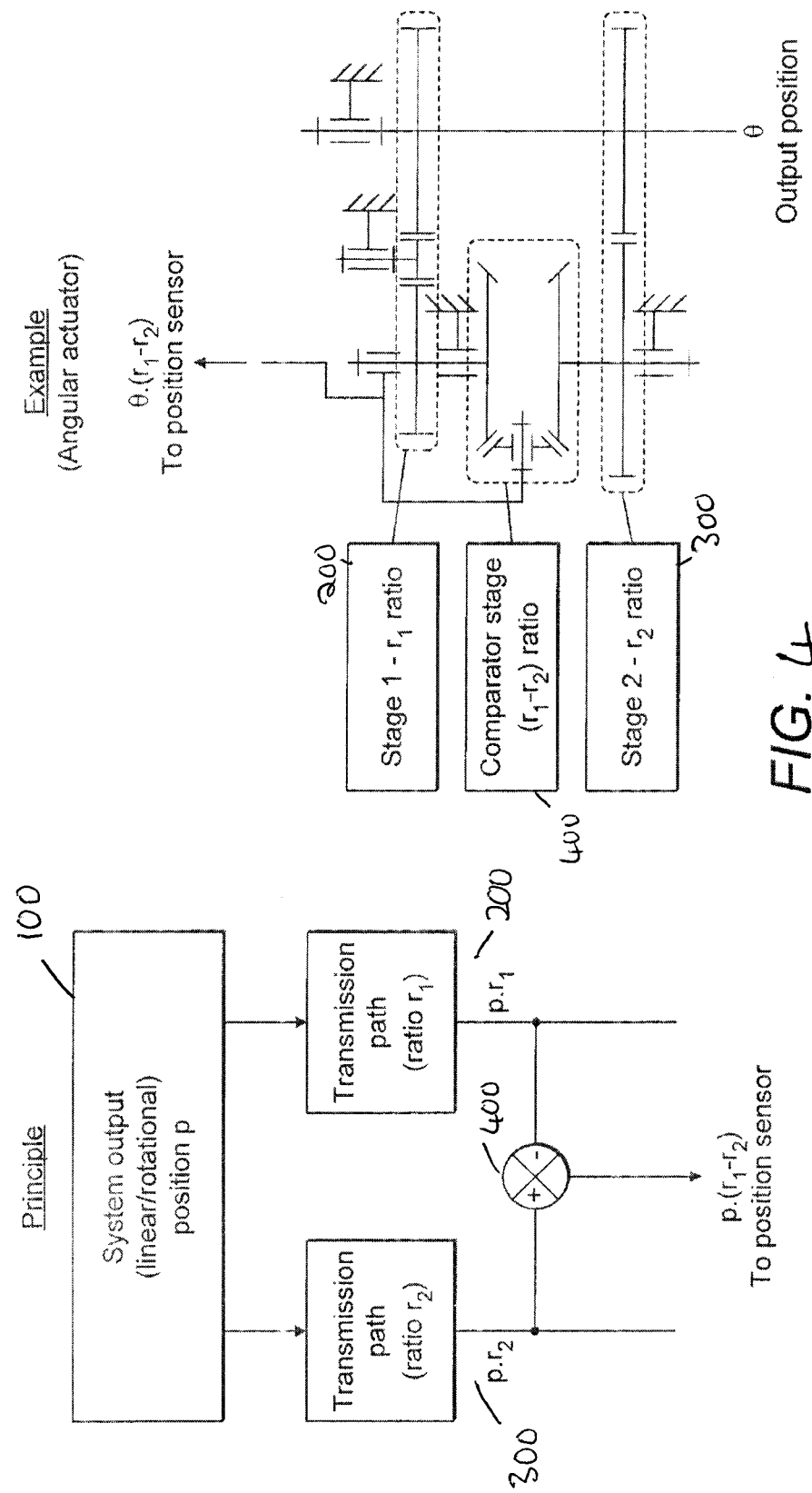
FIG. 3 shows the principle of a modified assembly according to the present disclosure.
FIG. 4 is a schematic view of an actuator assembly and position determining assembly using the principle shown in FIG. 3.

FIG. 3 shows the basic principles of operation. The actuator provides a system output 100 indicative of its position. The actuator may be linear, rotational etc. and the system output will therefore be a linear, angular etc. value indicative of actuator position p. This output needs to be provided to the position sensor in a reduced form that the position sensor can use to provide a useful indication of the position of the actuator (and, hence, the moveable component). To do this, two (in this case, although more can be used) outputs $p.r_1$ 200 and $p.r_2$ 300 are taken from two parallel kinematic or transmission paths having a slight ratio difference. The outputs $p.r_1$ 200 and $p.r_2$ 300 are provided to a comparator 400 which provides a position difference $p.(r_1-r_2)$ to a position sensor (not shown). The position sensor may be a dedicated position sensor for the actuator or any other equivalent device and may be e.g. a proportional or an on/off system.

FIG. 4 is a schematic view of an example of a position sensing system using the principles described above, for an example angular/rotary actuator. The actuator output position p—here an angle θ—is sensed on a first transmission path (stage 1, 200) at a first position, having a ratio $r_1$, and also on a second transmission path (stage 2, 300) having a second, different ratio $r_2$. The two stages each give a slightly different position value, being factored by the different ratios. These are provided to comparator 400 which outputs the difference $p(r_1-r_2)$—in this case $θ(r_1-r_2)$—to the position sensor. The position sensor is able to use this smaller (reduced) differential value to output a useful position measurement. The position sensor would not be able to use the large, raw output position θ, as mentioned above; this needs to be reduced.

The same principle can be applied to a linear actuator, where the output would be a linear value.

Thus, by using the parallel kinematic paths with different ratios, and taking the difference between their outputs as a reduced input for the position sensor, the need for reduction gearing and components is avoided.

The same principles could be realised using three or more parallel paths.

Often, actuator position measuring systems are already fitted with a second transmission path e.g. for redundancy. Such redundant paths are often provided in e.g. torque or speed summing actuators. This can, therefore, be used to incorporate this modified position sensing system. If no redundant transmission path exists in a system, this can be easily added.

The present differential system provides information on actuator position with significant gain (reduction) using fewer components than conventional systems. The use of two or more transmission paths can also be useful in providing information on synchronisation of the paths, and will provide indication of failure of a transmission path.

The position sensing system provides a smaller, lighter, simpler and more accurate position measurement system that can be manufactured more easily and at lower cost.

The disclosure has related to an example of a position measuring assembly and actuator assembly used for e.g. controlling the position of a horizontal stabilizer in an aircraft. The system described could, of course, also be used in other applications where a component is to be moved/positioned via an actuator.

The invention claimed is:

1. An actuation system comprising:
   an actuator assembly comprising an actuator shaft arranged to be rotated or moved linearly in response to an actuator control signal;
   a position sensor configured to provide an indication of a position of an object moved by rotation or movement of the actuator shaft; and
   an actuator position measurement assembly comprising:
   a first path arranged to provide a first output comprising a position of an actuator factored by a first ratio;
   a second path arranged to provide a second output comprising the position of the actuator factored by a second, different ratio; and
   a differential gear mechanism arranged to compare the first and second outputs and to provide a difference between the first and second outputs as the input to the position sensor;
   wherein the actuator shaft is coupled to the first and second paths.

2. The actuation system of claim 1, wherein the actuator shaft is an actuator screw shaft on which is mounted an actuator nut, wherein rotation of the actuator screw shaft causes a relative axial movement of the actuator nut along the shaft.

3. The actuation system as claimed in claim 2, further comprising a component to be moved, the component to be moved coupled to the actuator nut.

4. The actuation system as claimed in claim 1, wherein the actuator position measurement assembly further includes a third path arranged to provide a third output comprising a position of the actuator factored by a third, different ratio, the comparator providing a difference between the first, second and third outputs to the position sensor device.

5. The actuation system of claim 4, wherein the actuator shaft is an actuator screw shaft on which is mounted an actuator nut, wherein rotation of the actuator screw shaft causes a relative axial movement of the actuator nut along the shaft.

6. The actuation system as claimed in claim 5, further comprising a component to be moved, the component to be moved coupled to the actuator nut.

\* \* \* \* \*